United States Patent Office 3,123,618
Patented Mar. 3, 1964

3,123,618
9,10-DIHYDROANTHRACENE-9,10-ENDO-3',4'-PYRROLIDINES
Edward Lewis Schumann, 3021 Fleetwood Drive, Kalamazoo, Mich., and Edward McCreery Roberts, 6318 Mayflower Ave. and George Philip Claxton, 6705 Highland Ave., both of Cincinnati, Ohio
No Drawing. Filed Apr. 20, 1959, Ser. No. 807,334
7 Claims. (Cl. 260—313)

This invention relates to new chemical compounds and to processes for their preparation. More particularly, this invention relates to new 9,10-dihydroanthracene-9,10-endo-3',4'-pyrrolidines and their water soluble, acid addition and quaternary ammonium salts and to processes for the preparation of the new pyrrolidines.

The new compounds of the present invention are 9,10-dihydroanthracene-9,10-endo-3',4' - pyrrolidines of the structure

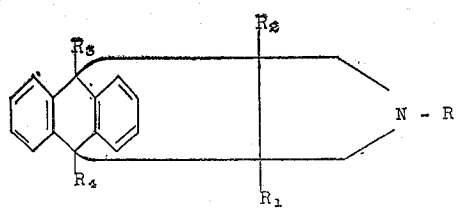

in which R represents hydrogen, lower alkyl, hydroxy lower alkyl, halo lower alkyl, dialkylamino lower alkyl, 3,4,5-trialkoxybenzoxy lower alkyl, alicyclic, aralkyl, aryl, substituted aryl or heterocyclic and $R_1$, $R_2$, $R_3$ and $R_4$ represent hydrogen, halo or alkyl.

The new compounds of the invention as a group have anti-inflammatory activity and are useful in the reduction of inflammation and edema and thus find application in the treatment of rheumatoid arthritis and other collagen diseases, gouty arthritis, neuralgia, bursitis, febrile states (including rheumatic fever), dermatosis and conjunctivitis. In addition to exhibiting the property of reducing inflammation and edema, a number of these compounds, as will be indicated later, possess other useful properties such as anti-convulsant activity, hypotensive activity, analgesic activity and anti-estrogenic activity.

The new compounds are basic and may be used either as the free bases or acid addition salts or as quaternary salts of these bases. The acid addition salts include the hydrochloride, hydrobromide, glycolate, acetate, tartrate, sulfate, acid succinate, maleate and others. The quaternary salts include the methosulfate, methiodide, ethiodide, methobromide, ethobromide and other lower alkyl halo quaternaries.

The new compounds can be administered orally in tablet form or other suitable form or parenterally. The preferred route of administration is oral. Orally the dosage range for humans may lie between 0.3 and 3 grams per day and by injection between 0.1 and 1 gram per day. It must be recognized, however, that in some cases more or less of the medicament may be desired so that the exact dosage may only be determined by the physician responsible. The dosage for animals may range from 1 mg. or more daily for a small animal, such as a cat, to 10 gm. daily for larger animals, such as cattle.

The compounds of the present invention may be prepared by following the synthetic scheme outlined below:

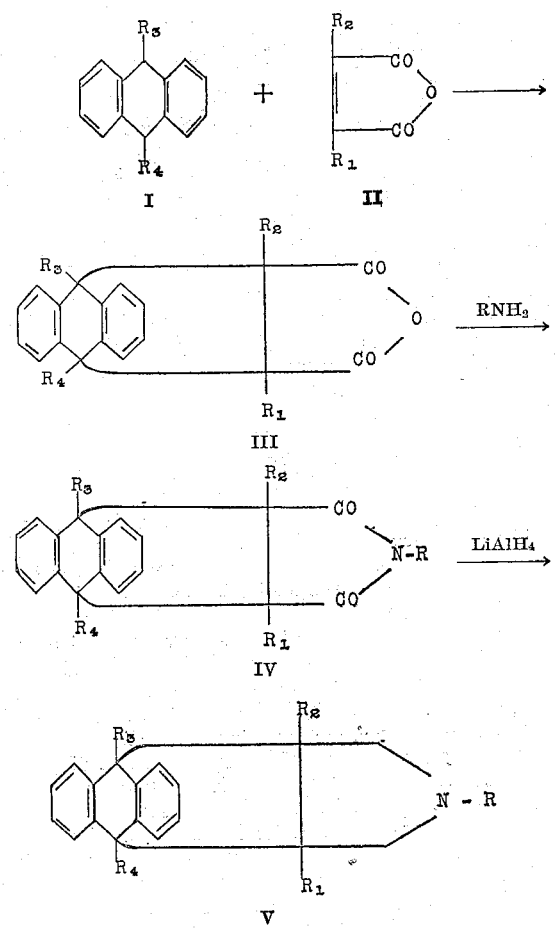

In these structures $R_1$, $R_2$, $R_3$ and $R_4$ represent hydrogen, alkyl or halo and R is the same as above with the exception that it may not be a halo lower alkyl when using LiAlH$_4$ as reducing agent.

The first step in this reaction sequence is a Diels-Alder reaction between anthracene or an appropriately substituted anthracene (I) and maleic anhydride or an appropriately substituted maleic anhydride (II). The Diels-Alder type adducts (III) thus obtained are readily converted into succinimides (IV) which in turn are reduced to the pyrrolidines (V) of the present invention.

The Diels-Alder reaction is carried out in an inert solvent such as toluene, sylene or decalin, or in an acidic solvent such as acetic acid or propionic acid.

The succinimides are obtained by treating the Diels-Alder type adducts with a primary amine in an inert hydrocarbon solvent or in an inert basic solvent such as pyridine or in an acidic solvent such as acetic acid. The free amine may be replaced by the mineral acid salt of a primary amine and an equivalent amount of an alkali metal acetate. Acetic acid is often used as the solvent when this replacement is effected. The amination may also be run in the complete absence of a solvent.

The final pyrrolidines (V) are obtained by the reduction of the resultant succinimides with lithium aluminum hydride in a benzene-ether solution or tetrahydrofurane, di-n-butyl ether, N-ethylmorpholine or the like. The pyrrolidines may be conveniently isolated and used as the free bases, as acid salts and as quaternary ammonium derivatives.

Certain modifications of the above reaction scheme have been made in cases where the intermediates are not stable in the presence of lithium aluminum hydride, or where better yields can be effcted by modifications. For instance, where R in the final pyrrolidine product is halo lower alkyl, it is convenient to prepare this product by treating a hydroxy lower alkyl pyrrolidine derivative with thionyl chloride to avoid possible reaction between the halo lower alkyl compound and lithium aluminum hydride. This halo lower alkyl pyrrolidine in turn is useful as an intermediate in the preparation of compounds such as substituted aryloxy lower alkyl derivatives by treating the halo derivative with the sodium salt of a substituted phenol.

When R represents hydrogen, the succinimide is not readily reduced to the pyrrolidine with lithium aluminum hydride, and it has been found that better yields may be obtained by preparing the N-benzyl pyrrolidine first and then removing the benzyl radical by hydrogenolysis.

Another variation of the synthetic method is illustrated in Example IX where a pyrrolidine derivative in which R is a hydroxy lower alkyl radical is prepared.

This invention is illustrated by the following examples, but not limited thereto.

EXAMPLE I

*N-Methyl-Cis-9,10-Dihydroanthracene-9,10-Endo-3',4'-Pyrrolidine Acid Succinate*

A mixture of 41.5 g. of cis-9,10-dihydroanthracene-9,10-endo-α,β-succinic anhydride, 10.1 g. of methylamine hydrochloride, 12.3 g. of anhydrous sodium acetate and 270 ml. of glacial acetic acid was heated to allow reflux for six hours and then poured into two liters of water. The aqueous mixture was brought to a boil and then refrigerated. The resulting crude solid was filtered off and recrystallized from 95% ethanol to give 36.4 g. (84%) of pure N-methyl-cis-9,10-dihydroanthracene-9,10-endo-α,β-succinimide, melting point 267–168° C.

A solution of 32.0 g. of N-methyl-cis-9,10-dihydroanthracene-9,10-endo-α,β-succinimide in 800 ml. of dry hot benzene was added to a stirred solution of 8.4 g. of lithium aluminum hydride in 1500 ml. of dry ether over a thirty minute period. After the mixture had been refluxed for an additional two hours, the excess lithium aluminum hydride was decomposed by the careful addition of 19.6 g. of ethyl acetate (ten percent in dry ether). The decomposition was allowed to proceed at reflux temperature for two hours, 40.0 g. of water being carefully added at the end of the first hour. The mixture was filtered to remove inorganic matter. The filtrate was evaporated to dryness to give 30.0 g. (103 percent) of crude N - methyl - cis-9,10-dihydroanthracene-9,10-endo-3',4'-pyrrolidine, melting point 78–86°.

The crude base in dry ether was treated with excess succinic acid in warm 1:1 acetone-butanone solution. The resultant white solid was recrystallized from 98 percent ethanol to give 31.0 g. (74 percent yield based on the starting imide) of N-methyl-cis-9,10-dihydroanthracene-9,10-endo-3',4'-pyrrolidine acid succinate, melting point 228–230°.

*Analysis.*—Calcd. for $C_{23}H_{25}NO_4$: C, 72.82; H, 6.64; N, 3.69. Observed: C, 72.88; H, 6.75; N, 3.88.

In addition to its anti-inflammatory activity, the compound also possesses hypotensive activity. Regeneration of the base from the acid succinate in dilute aqueous alkali gave a while solid, melting point 104–105°.

*Analysis.*—Calcd. for $C_{19}H_{19}N$: C, 87.30; H, 7.33; N, 5.36. Observed: C, 86.92; H, 7.33; N, 5.20.

EXAMPLE II

*N-Methyl-Cis-9,10-Dihydroanthracene-9,10-Endo-3',4'-Pyrrolidine Methosulfate*

A solution of 10.0 g. of N-methyl-cis-9,10-dihydroanthracene-9,10-endo-3',4'-pyrrolidine (regenerated from the acid succinate) and 5.3 g. of dimethylsulfate in 150 ml. of chloroform was heated in a pressure bottle for one hour. The chloroform was boiled off, and the residue was solidified by trituration with dry ether.

The product was recrystallized from isopropanol-ether and then from ethanol-ether to give a white crystalline product, melting point 113–115° after being dried in a vacuum oven twelve hours at 80° and six hours at 100°. This material proved to be the monohydrate.

Further drying at 100° and 0.2 mm. presure to constant weight gave anhydrous N-methyl-cis-9,10-dihydroanthracene-9,10-endo-3',4'-pyrrolidine methosulfate.

*Analysis.*—Calcd. for $C_{21}H_{25}NO_4S$: C, 65.08; H, 6.50; N, 3.61. Observed: C, 64.69; H, 6.56; N, 3.74.

EXAMPLE III

*N-Benzyl-Cis-9,10-Dihydroanthracene-9,10-Endo-3',4'-Pyrrolidine Hydrochloride*

A solution of 27.6 g. of cis-9,10-dihydroanthracene-9,10-endo-α,β-succinic anhydride and 10.7 g. of benzylamine in 250 ml. of glacial acetic acid was refluxed six hours. The reaction mixture was poured into one liter of water, heated to boiling, and refrigerated overnight. The crude imide, melting point 206–207°, weight 40.3 g. (110.3 percent), was collected by filtration and recrystallized from 1.5 liters of butanone to give 26.2 g. (71.8 percent) of N - benzyl-cis-9,10-dihydroanthracene-9,10-endo-α,β-succinimide, melting point 236–236.5°.

A solution of 26.2 g. of N-benzyl-cis-9,10-dihydroanthracene-9,10-endo-α,β-succinimide in 1050 ml. of anhydrous benzene was reduced with 5.46 g. of lithium aluminum anhydride in 1.5 liters of anhydrous ether, according to the reduction procedure in Example I except that the reduction was allowed to proceed at reflux for four hours. The crude product (22.3 g., melting point 108–115°) was isolated as was the product of Example I. Recrystallization of the crude base from isopropanol gave 16.1 g. (66.5%) of material, melting point 89–104°, which was converted to the hydrochloride salt by treatment of an ether solution of the base with a slight excess of 30% alcoholic hydrochloric acid. N-benzyl-cis-9,10-dihydroanthracene-9,10-endo-3',4'-pyrrolidine hydrochloride, melting point 254–257°, was isolated by filtration and dried to constant weight at 108°, in vacuo.

*Analysis.*—Calcd. for $C_{25}H_{24}NCl$: C, 80.32; H, 6.47; N, 3.75. Observed: C, 80.33; H, 6.60; N, 3.77.

EXAMPLE IV

*Cis-9,10-Dihydroanthracene-9,10-Endo-3',4'-Pyrrolidine Hydrochloride*

A solution of 6.0 g. of N-benzyl-cis-9,10-dihydroanthracene-9,10-endo-3',4'-pyrrolidine hydrochloride in 250 ml. of absolute ethanol was shaken in a Paar hydrogenation apparatus under an initial hydrogen pressure of 44.2 pounds at 60° C., in the presence of 1.0 g. of palladium black. After eight hours, the hydrogen uptake was 1.3 pounds (theory for the debenzylation requires 1.2 pounds). The hydrochloride of the desired product which had precipitated out of solution during the course of the hydrogenation was redissolved by the addition of 100 ml. of water and heating of the mixture on the steam bath. The catalyst was removed by filtration. The filtrate was reduced in volume to 250 ml. by evaporation on the steam bath. Refrigeration at −30° C. of the filtrate brought about the crystallization of 3.48 g. (85 percent) of cis-9,10-dihydroanthracene-9,10-endo-3',4'-pyrrolidine hydrochloride, melting point >350° C.

*Analysis.*—Calcd. for $C_{18}H_{18}NCl$: C, 76.17; H, 6.39; N, 4.93. Observed: C, 75.91; H, 6.45; N, 4.93.

EXAMPLE V

*N-Ethyl-Cis-9,10-Dihydroanthracene-9,10-Endo-3',4'-Pyrrolidine Acid Succinate*

Following the procedure of Example III, an equivalent amount of ethylamine being used in place of the amine of Example III, cis-9,10-dihydroanthracene-9,10-endo-α,β-succinic anhydride was converted to N-ethyl-cis-9,10-dihydroanthracene - 9,10 - endo-α,β-succinimide, melting point 82–183° after recrystallization from 95 percent ethanol, weight 28.3 g. (93 percent).

Following the reduction procedure of Example I 22.0 g. of N-ethyl-cis-9,10-dihydroanthracene - 9,10 - endo-α,β-succinimide in 250 ml. of warm dry benzene was reduced by 5.5 g. of lithium aluminum hydride in 1200 ml. of anhydrous ether. The free base was not isolated. After removal of inorganic salts by filtration from the decomposed reaction mixture, the ether-benzene solution was dried over magnesium sulfate and treated with 8.55 g. of succinic acid in 400 ml. of hot acetone. This procedure gave, after refrigeration, N-ethyl-cis-9,10-dihydroanthracene - 9,10 - endo-3',4'-pyrrolidine acid succinate which after recrystallization from butanone weighed 21.3 g. (75 percent), melting point 176–177°.

*Analysis.*—Calcd. for $C_{24}H_{27}NO_4$: C, 73.27; H, 6.92; N, 3.52. Observed: C, 73.05; H, 6.83; N, 3.77.

EXAMPLE VI

*N-(n-Propyl)-Cis-9,10-Dihydroanthracene-9,10-Endo-3',4'-Pyrrolidine Hydrochloride*

Following the procedure of Example III, an equivalent amount of n-propylamine being used in place of the amine of Example III, cis-9,10-dihydroanthracene-9,10-endo-α,β-succinic anhydride was converted to N-(n-propyl) - cis - 9,10-dihydroanthracene-9,10-endo-α,β-succinimide, melting point 189–191° from 95 percent ethanol, weight 22.1 g. (70 percent).

Following the reduction procedure of Example I, 30.0 g. of N-(n-propyl)-cis-9,10-dihydroanthracene-9,10-endo-α,β-succinimide in one liter of warm, dry benzene was added to 7.2 g. of lithium aluminum hydride in 1.5 liters of dry ether. Removal of the inorganic salts by filtration and evaporation of the benzene-ether solvent gave N-(n-propyl) - cis-9,10-dihydroanthracene-9,10-endo-3',4'-pyrrolidine, melting point 135–137° after recrystallization from methanol-water, weight 16.5 g. (60 percent).

*Analysis.*—Calcd. for $C_{21}H_{23}N$: C, 87.16; H, 8.01; N, 4.84. Observed: C, 87.06; H, 8.19; N, 4.84.

A solution of 13.0 g. of the free base in 700 ml. of dry ether was treated with a slight excess of 30 percent alcoholic hydrochloric acid. Two recrystallizations from butanone gave pure N-(n-propyl)-cis-9,10-dihydroanthracene-9,10-endo-3',4'-pyrrolidine hydrochloride, melting point 202–203° after drying overnight at 100° C. and 0.2 mm. pressure, weight 9.8 g.

*Analysis.*—Calcd. for $C_{21}H_{24}NCl$: C, 77.40; H, 7.42; N, 4.30. Observed: C, 76.87; H, 7.66; N, 4.20.

EXAMPLE VII

*N-(Isopropyl)-Cis-9,10-Dihydroanthracene-9,10-Endo-3',4'-Pyrrolidine Acid Succinate*

Following the procedure of Example III, and equivalent amount of isopropylamine being used in place of the amine of Example III, cis-9,10-dihydroanthracene-9,10-endo-α,β-succinic anhydride was converted to N-(isopropyl) - cis - 9,10-dihydroanthracene-9,10-endo-α,β-succinimide, melting point 195–197° after two recrystallizations from 95 percent ethanol, weight 23.1 g. (73 percent).

Following the reduction procedure of Example I, 33.1 g. of N - (isopropyl) - cis - 9,10-dihydroanthracene-9,10-endo-α,β-succinimide in 300 ml. of dry benzene was added to 7.92 g. of lithium aluminum hydride in one liter of absolute ether. Removal of the inorganic salts by filtration and evaporation of the solvent gave 29.5 (98 percent) of the crude base, melting point 135–140°. An analytical sample obtained by recrystallizing the crude base from methanol melted at 146.5–147.5°.

*Analysis.*—Calcd. for $C_{21}H_{23}N$: C, 87.17; H, 8.01; N, 4.84. Observed: C, 87.16; H, 8.26; N, 4.78.

A solution of 10.6 g. of N-(isopropyl)-cis-9,10-dihydroanthracene-9,10-endo-3',4'-pyrrolidine in absolute ether was treated with 4.45 g. of succinic acid in 350 ml. of acetone to yield, after refrigeration at —20° C., 12 g. of N-(isopropyl) - cis - 9,10-dihydroanthracene-9,10-endo-3',4'-pyrrolidine acid succinate which after recrystallization from butanone melted at 203–205.5° C. and weighed 9.8 g. (65 percent). An analytical sample (same melting point) was prepared by recrystallization from isopropyl acetate.

*Analysis.*—Calcd. for $C_{25}H_{29}NO_4$: C, 73.68; H, 7.17; N, 3.44. Observed: C, 73.28; H, 7.10; N, 3.57.

In addition to its anti-inflammatory activity the compound also possesses analgesic activity.

EXAMPLE VIII

*N-Cyclohexyl-Cis-9,10-Dihydroanthracene-9,10-Endo-3',4'-Pyrrolidine Hydrochloride*

Following the procedure of Example III, with an equivalent amount of cyclohexylamine being used in place of the amine of Example III, cis-9,10-dihydroanthracene-9,10-endo-α,β-succinic anhydride was converted to N-cyclohexyl - cis-9,10-dihydroanthracene-9,10-endo-α,β-succinimide, melting point 216–218° C. from butanone, in 69 percent yield after recrystallization from butanone.

Following the reduction procedure of Example I, a solution of 15.2 g. of N-cyclohexyl-cis-9,10-dihydroanthracene-9-10-endo-α,β-succinimide in 400 ml. of dry benzene was treated with a suspension of 3.34 g. of lithium aluminum hydride in 800 ml. of absolute ether. The reduction was allowed to proceed at reflux for three hours before the work-up was carried out according to the procedure of Example I. In this case it was necessary to elute the inorganic filter-cake with hot benzene to prevent serious loss of product. This procedure yielded 12.45 g. (86 percent) of crude N-cyclohexyl-cis-9,10-dihydroanthracene-9,10-endo-3',4'-pyrrolidine, melting point 223–229° C., which was recrystallized once from butanone to give 7.93 g. of material, melting point 224–230° C.

The partially purified N-cyclohexyl-cis-9,10-dihydroanthracene-9,10-endo-3',4'-pyrrolidine was dissolved in 300 ml. of methanol and treated with excess 30 percent alcoholic hydrochloric acid to give N-cyclohexyl-cis-9,10-dihydroanthracene-9,10-end-3',4'-pyrrolidine hydrochloride, melting point 286–290° C. from methanol. The product was dried to constant weight at 80° C. in vacuo.

*Analysis.*—Calcd. for $C_{24}H_{27}N$: C, 78.78; H, 7.71; N, 3.83. Observed: C, 78.97; H, 7.82; N, 3.94.

EXAMPLE IX

*N-(β-Hydroxyethyl)-Cis-9,10-Dihydroanthracene-9,10-Endo-3',4'-Pyrrolidine Acid Succinate*

A mixture of 27.6 g. of cis-9,10-dihydroanthracene-9,10-endo-α,β-succinic anhydride and 6.1 g. of ethanolamine was heated at 170–180° C. for one hour. The reaction temperature was increased briefly to 300° C. to effect complete melting. After cooling, the crude product was recrystallized once from 95 percent ethanol (with decolorizing charcoal) and twice from butanone to give 16.7 g. (52 percent) of N-(β-hydroxyethyl)-cis-9,10-dihydroanthracene-9,10-endo-α,β-succinimide, melting point 218–220° C.

Treatment of cis-9,10-dihydroanthracene-9,10-endo-α,β-succinic anhydride with an equivalent amount of ethanolamine in glacial acetic acid, according to the procedure of Example III, gave N-(β-acetoxyethyl)-cis-9,10-dihydroanthracene-9,10-endo-α,β-succinimide, melting point 145–147° C. after two recrystallizations from methanol (using decolorizing charcoal), weight 18 g. (50 percent).

Reduction of either N-(β-hydroxyethyl)-cis-9,10-dihydroanthracene-9,10-endo-α,β-succinimide (20.0 g. in 1.5 liters of dry benzene with 5.4 g. of lithium aluminum hydride in two liters of absolute ether) or N-(β-acetoxyethyl)-cis-9,10-dihydroanthracene-9,10-endo-α,β-succinimide (33.0 g. in 60 ml. of dry benzene with 10.4 g. of lithium aluminum hydride in 1.5 liters of absolute ether) according to the procedure of Example I yielded N-(β-hydroxyethyl)-cis-9,10-dihydroanthracene-9,10-endo-3',4'-pyrrolidine, isolated as its acid succinate (according to the procedure of Example 7), melting point 147–148° C.; yield, after one recrystallization from butanone, 51 percent from the β-hydroxyethyl compound and 71 percent from the β-acetoxyethyl compound.

*Analysis.*—Calcd. for $C_{24}H_{27}NO_5$: C, 70.40; H, 6.65; N, 3.42. Observed: C, 70.24; H, 6.61; N, 3.50.

In addition to its anti-inflammatory activity the compound also possesses anti-convulsant activity.

EXAMPLE X

*N-(β-Chloroethyl)-Cis-9,10-Dihydroanthracene-9,10-Endo-3',4'-Pyrrolidine Hydrochloride*

A solution of N(β-hydroxyethyl)-cis-9,10-dihydroanthracene-9,10-endo-3',4'-pyrrolidine (obtained by the regeneration in aqueous alkali of 14.0 g. of the acid succinate of Example IX) in 200 ml. of warm dry benzene was added to a solution of 8.3 g. of thionyl chloride in 200 ml. of dry benzene. The solution was refluxed with stirring for two hours, cooled to allow precipitation and filtered. The filter-cake was washed with dry ether and air dried. Recrystallization of the product from butanone gave 10.8 g. (91 percent) of N-(β-chloroethyl)-cis-9,10-dihydroanthracene-9,10-endo-3',4'-pyrrolidine hydrochloride hemihydrate, melting point 207–208° C.

An analytical sample was dried at 100° C. and 0.2 mm. pressure for four hours to give the anhydrous hydrochloride salt.

*Analysis.*—Calcd. for $C_{20}H_{21}NCl_2$: C, 69.37; H, 6.11; N, 4.04. Observed: C, 69.08; H, 6.16; N, 4.13.

EXAMPLE XI

*N-(β-3,4,5-Trimethoxybenzoxyethyl)-Cis-9,10-Dihydroanthracene-9,10-Endo-3',4'-Pyrrolidine*

A solution of 13.1 g. of N-(β-hydroxyethyl)-cis-9,10-dihydroanthracene-9,10-endo-3',4'-pyrrolidine acid succinate (Example IX) in water was treated with a slight excess of aqueous alkali to give the free base which was collected by filtration, dried and dissolved in 100 ml. of dry benzene. To the benzene solution was added, dropwise, with stirring, a solution of 7.6 g. of 3,4,5-trimethoxybenzoyl chloride in dry benzene. After the addition was complete, stirring at reflux was continued for three hours. Evaporation of most of the benzene and dilution with anhydrous ether precipitated the desired ester hydrochloride. The product was dissolved in water and neutralized with sodium bicarbonate to liberate the free base which was extracted with chloroform. Evaporation of the chloroform solution gave an oil which crystallized on standing at room temperature. Recrystallization from aqueous ethanol gave 2.0 g. (13 percent) of N-(β-3,4,5-trimethoxybenzoxyethyl)-cis-9,10-dihydroanthracene-9,10-endo-3',4'-pyrrolidine, melting point 158–160° C.

*Analysis.*—Calcd. for $C_{30}H_{31}O_5N$: C, 74.20; H, 6.44; N, 2.89. Observed: C, 74.14; H, 6.10; N, 2.91.

EXAMPLE XII

*N-Phenyl-Cis-9,10-Dihydroanthracene-9,10-Endo-3',4'-Pyrrolidine Hydrochloride*

Folowing the procedure of Example III, an equivalent amount of aniline being used in place of the amine of Example III, cis-9,10-dihydroanthracene-9,10-endo-α,β-succinic anhydride was converted to N-phenyl-cis-9,10-dihydroanthracene-9,10-endo-α,β-succinimide. Isolation of the 35.3 g. (100 percent) of crude product, melting point 206–220° C., followed the procedure of Example III. Recrystallization from butanone gave 27.3 g. (78 percent) of N-phenyl-cis-9,10-dihydroanthracene-9,10-endo-α,β-succinimide, melting point 226° C.

A solution of 26.6 g. of N-phenyl-cis-9,10-dihydroanthracene-9,10-endo-α,β-succinimide in 750 ml. of warm, dry benzene was treated according to the reduction procedure of Example I with 5.75 g. of lithium aluminum hydride in 1500 ml. of dry ether. The decomposed reaction mixture was filtered to give a benzene-ether solution of the product which was dried over magnesium sulfate and treated with excess 30 percent alcoholic hydrochloric acid. This procedure yielded 24.0 g. (87 percent) of crude hydrochloride salt, melting point 223–230° C. Three recrystallizations from 95 percent ethanol (using decolorizing charcoal) gave 8.2 g. (30 percent) of N-phenyl-cis-9,10-dihydroanthracene-9,10-endo-3',4'-pyrrolidine hydrochloride, melting point 240–242° C. with decomposition.

*Analysis.*—Calcd. for $C_{24}H_{22}NCl$: C, 80.10; H, 6.16; N, 3.89. Observed: C, 79.75; H, 6.61; N, 4.06.

EXAMPLE XIII

*N-(p-Hydroxyphenyl)-Cis-9,10-Dihydroanthracene-9,10-Endo-3',4'-Pyrrolidine Hydrochloride*

Following the procedure of Example III, an equivalent amount of p-aminophenol being used in place of the amine of Example III, cis-9,10-dihydroanthracene-9,10-endo-α,β-succinic anhydride was converted to crude N-(p-hydroxyphenyl)-cis-9,10-dihydroanthracene-9,10-endo-α,β-succinimide. The product was purified by recrystallization from one liter of hot acetone (considerable material being insoluble in the acetone), decolorizing charcoal being used. Two further recrystallizations from butanone gave 12.6 g. (35 percent) of the purified succinimide, melting point 324–327° C. An analytical sample, melting point 334–335° C., was prepared by further recrystallization from butanone.

Following the reduction procedure of Example I, 31.8 g. of N-(p-hydroxyphenyl)-cis-9,10-dihydroanthracene-9,10-endo-α,β-succinimide was suspended in 500 ml. of dry benzene and treated with 6.71 g. of lithium aluminum hydride in one liter of absolute ether. The reaction mixture was refluxed for four hours and worked up by filtration and evaporation as in Example I, except that it was necessary to extract the inorganic filter cake in a Soxhlet extractor with benzene in order to have an appreciable yield of product. This procedure gave 17.25 g. (65 percent) of crude base which on treatment with charcoal during recrystallization from aqueous methanol gave 12.84 g. of N-(p-hydroxyphenyl)-cis-9,10-dihydroanthracene-9,10-endo-3',4'-pyrrolidine, melting point 145–150° C. Further purification was carried out on the hydrochloride salt below.

Treatment of 5.0 g. of the partially purified base in 350 ml. of absolute ethanol with excess 30 percent alcoholic hydrochloric acid yielded, on dilution with absolute ether, 3.91 g. (70.7 percent) of N-(p-hydroxyphenyl)-cis-9,10-dihydroanthracene-9,10-endo-3',4'-pyrrolidine hydrochloride, melting point 282–286° C. after drying to constant weight in vacuo.

*Analysis.*—Calcd. for $C_{24}H_{22}NOCl$: C, 76.70; H, 5.90; N, 3.73. Observed: C, 77.01; H, 6.07; N, 3.84.

In addition to its anti-inflammatory activity, the compound also possesses anti-convulsant activity.

EXAMPLE XIV

*N-[p-(2-Diethylamino Ethoxy)Phenyl]-Cis-9,10-Dihydroanthracene-9,10-Endo-3',4'-Pyrrolidine*

A mixture of 44.8 g. of N-(p-hydroxyphenyl)-cis-9,10-dihydroanthracene-9,10-endo-α,β-succinimide and 7.2 g. of sodium ethoxide was refluxed in 300 ml. of absolute ethanol for 0.5 hour and treated with a solution of 26.4 g. of β-diethylaminoethyl chloride in 145 ml. of toluene. The reaction mixture was refluxed three hours, filtered to remove sodium chloride, and subjected to solvent removal by evaporation. The residue was taken up in two liters of ether in the presence of 500 ml. of five percent sodium hydroxide. The ether was evaporated to give the crude N - [p - (2 - diethylaminoethoxy)phenyl]-cis-9,10-dihydroanthracene-9,10-endo-α,β-succinimide which, after recrystallization from isopropanol weighed 23.1 g. (37 percent) and melted at 137–138° C.

Following the reduction procedure of Example I, 14.1 g. of N-[p-(2-diethylaminoethoxy)phenyl]-cis-9,10-dihydroanthracene-9,10-endo-α,β-succinimide in 350 ml. of dry benzene was treated with 2.3 g. of lithium aluminum hydride in 800 ml. of absolute ether. After refluxing 3.5 hours, the reaction mixture was worked up as described in Example I to give a tarry residue. The product was purified by formation of the dihydrochloride salt in isopropanol with excess 30 percent alcoholic hydrochloric acid. The dihydrochloride was recrystallized from chloroform-ethyl acetate and regenerated in aqueous solution with ten percent sodium hydroxide. Filtration yielded N-[p-(2-diethylaminoethoxy)phenyl] - cis - 9,10-dihydroanthracene-9,10-endo - 3′,4′ - pyrrolidine, melting point 118.5–120° C., weight 1.94 g. (15 percent).

*Analysis.*—Calcd. for $C_{30}H_{34}N_2O$: C, 82.15; H, 7.81; N, 6.39. Observed: C, 81.96; H, 7.94; N, 6.63.

EXAMPLE XV

*N-(4-Pyridyl)-Cis-9,10-Dihydroanthracene - 9,10 - Endo-3′,4′-Pyrrolidine Dihydrochloride*

A mixture of 27.60 g. of cis-9,10-dihydroanthracene-9,10-endo-α,β-succinic anhydride and 9.41 g. of 4-aminopyridine was fused and allowed to react at 200–240° C. for 0.5 hour. The reaction mixture was allowed to cool before recrystallization from butanone with charcoal treatment to yield 11.3 g. (32 percent) of N-(4-pyridyl)-cis-9,10-dihydroanthracene - 9,10 - endo-α,β-succinimide, melting point 294–297° C.

Without further purification, 10.6 g. of the imide in 300 ml. of dry benzene was treated with 3.42 g. of lithium aluminum hydride in one liter of absolute ether according to the procedure in Example I. The reaction was allowed to proceed for 2.5 hours at reflux. After decomposition of the excess lithium aluminum hydride and inorganic complexes, the reaction mixture was filtered, the filter cake was extracted with benzene, and the combined filtrate and extracts were reduced in volume to 600 ml. and treated with excess 30 percent alcoholic hydrochloric acid. Additional ether was added to bring about the precipitation of the N-(4-pyridyl)-cis-9,10-dihydroanthracene-9,10-endo - 3′,4′ - pyrrolidine dihydrochloride, 2.83 g. (23.6 percent), melting point (decomp.) 235° C.

*Analysis.*—Calcd. for $C_{23}H_{22}Cl_2$: C, 69.54; H, 5.58; N, 7.05. Observed: C, 69.72; H, 5.56; N, 7.21.

EXAMPLE XVI

*N-(β-Dimethylaminoethyl)-Cis-9,10-Dihydroanthracene-9,10-Endo-3′,4′-Pyrrolidine Di-Acid Succinate*

A mixture of 41.5 g. of cis-9,10-dihydroanthracene-9,10-endo-α,β-succinic anhydride and 13.3 g. of β-dimethylaminoethylamine was heated at 170–180° C. for one hour and then at 200–210° C. for three hours. The melt solidified on cooling. Recrystallization of the product from aqueous methanol gave 14.5 g. of material, melting point 175–195° C. A second crop, obtained by adding water to the first crop's mother liquor, weighed 25.5 g. and melted at 194–199° C. Several recrystallizations of each crop, separately, from aqueous methanol gave a total of 22 g. (42 percent) of N-(β-dimethylaminoethyl)-cis-9,10-dihydroanthracene - 9,10-endo-α,β-succinimide, melting point 195–197° C.

Following the reduction procedure of Example I, 24.5 g. of N-(β-dimethylaminoethyl)-cis-9,10-dihydroanthracene-9,10-endo-α,β-succinimide in one liter of a warm mixture of dry ether-benzene (7:3) was treated with 5.4 g. of lithium aluminum hydride in 500 ml. of dry ether.

The decomposed reaction mixture was filtered, dried and evaporated as in the procedure of Example I to give an oil which was dissolved in 200 ml. of butanone and treated with 16.8 g. of succinic acid in 600 ml. of warm butanone. The butanone was evaporated to give a residual semi-solid product, readily crystallizable from dry ethanol-ether to give 11.0 g. of the desired di-acid succinate, melting point 148–150° C. An additional recrystallization from butanone gave 9.0 g. (23 percent) of N-(β-dimethylaminoethyl)-cis-9,10-dihydroanthracene-9,10 - endo - 3′,4′-pyrrolidine di-acid succinate, melting point 151–152° C.

*Analysis.*—Calcd. for $C_{30}H_{38}N_2O_4$: C, 64.98; H, 6.91; N, 5.05. Observed: C, 64.87; H, 7.06; N, 4.95.

EXAMPLE XVII

*N,9-Dimethyl-Cis-9,10-Dihydroanthracene-9,10-Endo-3′,4′-Pyrrolidine Acid Succinate*

Following the procedure of Example I, an equivalent amount of 9-methyl-cis - 9,10 - dihydroanthracene - 9,10-endo-*a,b*-succinic anhydride, prepared by the method of Bachmann and Kloetzel, J. Am. Chem. Soc. 60, 481 (1938), being used instead of the anhydride of Example I, 9-methyl-cis-9,10-dihydroanthracene-9,10-endo-α,β-succinic anhydride was converted to N,9-dimethyl-cis-9,10-dihydroanthracene-9,10-endo-α,β-succinimide which after recrystallization from butanone weighed 24.2 g. (58 percent) and melted at 237–239° C.

Following the reduction procedure of Example I, 11.5 g. of N,9-dimethyl-cis-9,10-dihydroanthracene-9,10-endo-α,β-succinimide in 500 ml. of dry benzene was treated with 2.9 g. of lithium aluminum hydride in one liter of absolute ether. The decomposed reaction mixture was filtered and evaporated to give the crude product which was dissolved in anhydrous ether and treated with a solution of 4.5 g. of succinic acid in warm butanone. Recrystallization of the precipitated salt from butanone gave 9.6 g. (64 percent) of pure N,9-dimethyl-cis-9,10-dihydroanthracene-9,10-endo - 3′,4′ - pyrrolidine acid succinate, melting point 165–167° C.

*Analysis.*—Calcd. for $C_{24}H_{27}NO_4$: C, 73.27; H, 6.92; N, 3.56. Observed: C, 73.14; H, 6.94; N, 3.58.

In addition to its anti-inflammatory activity, the compound also possesses hypotensive activity.

EXAMPLE XVIII

*N-Methyl-Cis-9,10-Dihydroanthracene-9,10-Endo-3′,4′-(3′-Methylpyrrolidine) Acid Oxalate*

A mixture of 89.1 g. of anthracene and 56 g. of citraconic anhydride in 500 ml. of xylene was refluxed for three hours, then refrigerated and filtered to yield crude cis-9,10-dihydroanthracene-9,10-endo-α,β-(α-methylsuccinic anhydride) after which two recrystallizations from benzene weighed 100.2 g. (70 percent) and melted at 160–162° C. The product was evidently contaminated to the extent of 27 percent with anthracene.

Following the procedure of Example I, an equivalent amount of the crude adduct of this example being substituted for cis-9,10-dihydroanthracene-9,10-endo-α,β-succinic anhydride, cis-9,10-dihydroanthracene-9,10-endo-α,β-(α-methylsuccinic anhydride) was converted to N-methyl-cis-9,10-dihydroanthracene-9,10 - endo-α,β-(α-methylsuccinimide). The crude material was recrystallized once from 95 percent ethanol and twice from isopropanol. Although 550 ml. of boiling solvent was used for the first isopropanol recrystallization, considerable material failed to dissolve and was discarded. The still crude N-methyl-cis-9,10-dihydroanthracene-9,10 - endo-α,β-(α-methylsuccinimide), melting point 168–169° C., weight 15.5 g. (51 percent), containing about 24 percent anthracene, was not purified further.

Following the reduction procedure of Example I, the anthracene-contaminated imide from the above was dissolved in three liters of anhydrous ether and added to 3.8 g. of lithium aluminum hydride in 500 ml. of anhydrous ether. The isolation procedure followed that of Example I through the production of the crude, residual base after solvent evaporation. The crude product was dissolved in methanol, made acidic with dilute hydrochloric acid, diluted with water, and filtered to remove insoluble, non-basic material. The filtrate was made alkaline with dilute sodium hydroxide and extracted with ether. The ether extract was dried over magnesium sulfate and treated with an excess of an ether solution of anhydrous oxalic acid. The precipitated salt was dissolved in 250 ml. of butanone (plus absolute ethanol to clear the solution). The butanone-ethanol solution was diluted to the cloud point with absolute ether and refrigerated to yield 4.0 g. (23 percent) of pure N-methyl-cis-9,10-dihydroanthracene-9,10-endo-3',4'-(3'-methylpyrrolidine) acid oxalate, melting point 208–209° C.

*Analysis.*—Calcd. for $C_{22}H_{23}NO_4$: C, 72.32; H, 6.34; N, 3.83. Observed: C, 72.39; H, 6.71; N, 3.85.

In addition to its anti-inflammatory activity, the compound also possesses anti-estrogen activity.

EXAMPLE XIX

*N-Methyl-Cis-9,10-Dihydroanthracene-9,10-Endo-3',4'- (3'-Chloropyrrolidine) Hydrochloride*

A solution of 35.6 g. of anthracene and 26.5 g. of chloromaleic anhydride in 500 ml. of xylene was heated at reflux for 63 hours and then decanted from a small amount of residual tar. The solution, on standing at —20° C., deposited 46.4 g. of crude adduct, melting point 148–152° C. Decolorizing with charcoal during recrystallization from 800 ml. of glacial acetic acid by the addition of 800 ml. of water gave 39.3 g. (63.3 percent) of purified cis-9,10-dihydroanthracene-9,10-endo-α,β-(α-chlorosuccinic anhydride), melting point 151–154° C.

Following the procedure of Example I, an equivalent amount of the chloromaleic adduct from above being used in place of the adduct of Example I and 385 ml. of glacial acetic acid being used in place of the quantity specified in Example I, cis-9,10-dihydroanthracene-9,10-endo-α,β-(α-chlorosuccinic anhydride) was converted to N-methyl-cis-9,10-dihydroanthracene-9,10-endo-α,β-(α-chlorosuccinimide) in 76 percent yield after recrystallization from isopropanol. The purified product melted at 163–167° C.

Following the reduction procedure of Example I, a solution of 31.3 g. of N-methyl-cis-9,10-dihydroanthracene-9,10-endo-α,β-(α-chlorosuccinimide) in 500 ml. of dry benzene was added dropwise to a suspension of 7.38 g. of lithium aluminum hydride in one liter of absolute ether and refluxed for 2.5 hours. After decomposition of the excess lithium aluminum hydride as in Example I and removal of inorganic material by filtration, the solvent of the filtrate was evaporated on the steam bath to a volume of 75–100 ml. The addition of 30 ml. of absolute ether caused formation of a precipitate which was collected by filtration and discarded. The mother liquor, on standing at room temperature with slow evaporation for a few days, yielded N-methyl-cis-9,10-dihydroanthracene-9,10-endo-3',4'-(3'-chloropyrrolidine), melting point 130–132° C., which after two recrystallizations from 50 percent aqueous ethanol weighed 11.48 g. (38.8 percent) and melted at 130–130.5° C.

*Analysis.*—Calcd. for $C_{19}H_{18}NCl$: C, 77.14; H, 6.13; N, 4.74. Observed: C, 76.99; H, 6.28; N, 4.77.

The free base (10.91 g.) was dissolved in absolute ether and treated with excess 30 percent alcoholic hydrochloric acid. The hydrochloride was collected by filtration, recrystallized from 2.2 liters of 1:10 ethanol-ether and dried ten hours at 78° and 0.5 mm. pressure to give pure N-methyl-cis-9,10-dihydroanthracene-9,10-endo-3',4'-(3'-chloropyrrolidine) hydrochloride, melting point 257–258° C., weight 10.66 g.

*Analysis.*—Calcd. for $C_{19}H_{19}NCl_2$: C, 68.68; H, 5.76; N, 4.22. Observed: C, 68.64; H, 6.11; N, 4.14.

EXAMPLE XX

*N-Methyl-Cis-9,10-Dihydroanthracene-9,10-Endo-3',4'- (3',4'-Dichloropyrrolidine) Hydrochloride*

Following the adduct-formation procedure of Example XIX, 33.39 g. of α,β-dichloromaleic anhydride was converted, after 17 hours of refluxing, to cis-9,10-dihydroanthracene-9,10-endo- α,β - (α,β - dichlorosuccinic anhydride), melting point 238–243° C. and weight 30.2 g. (45 percent) after recrystallization from glacial acetic acid.

Following the procedure of Example I, an equivalent amount of the dichloromaleic adduct from above being used in place of the adduct of Example I, cis-9,10-dihydroanthracene-9,10-endo- α,β - (α,β - dichlorosuccinic anhydride) was converted to N-methyl-cis-9,10-dihydroanthracene-9,10-endo-α,β-(α,β-dichlorosuccinimide). The product was purified by trituration with boiling isopropanol and recrystallization from methylene chloride to give a 48 percent yield of the desired imide, melting point 293–294.5° C.

Following the reduction procedure of Example I, a solution of 14.57 g. of N-methyl-cis-9,10-dihydroanthracene-9,10-endo-α,β-(α,β-dichlorosuccinimide) in 700 ml. of dry benzene was treated with 3.15 g. of lithium aluminum hydride in one liter of absolute ether, the reaction being allowed to proceed at reflux for two hours prior to decomposition and work up to yield 11.25 g. of reduced product, melting point 172–180° C. The infrared spectrum showed strong carbonyl absorption (5.82μ), indicating the crude product to be incompletely reduced and probably contaminated with the corresponding lactam. The crude product was subjected to reduction again, as above, using similar solvent volumes and 1.59 g. of lithium aluminum hydride. This procedure gave 8.36 g. (61.6 percent yield based on the starting imide) of N-methyl-cis-9,10-dihydroanthracene-9,10-endo-3',4'-(3',4'-dichloropyrrolidine), melting point 200–203° C. Further purification was effected by recrystallization from benzene to give 5.94 g. of material, melting point 203.5–205° C.

*Analysis.*—Calcd. for $C_{19}H_{17}NCl_2$: C, 69.10; H, 5.19; N, 4.24. Observed: C, 69.24; H, 5.25; N, 4.24.

The hydrochloride, melting point (decomp.) 268° C., was obtained in 97.7 percent yield by treating an ether solution of the free base with a slight excess of 30 percent alcoholic hydrochloric acid. The salt was dried 18 hours at 70–100° and 0.5 mm. pressure.

*Analysis.*—Calcd. for $C_{19}H_{18}NCl_3$: C, 62.23; H, 4.95; N, 3.82. Observed: C, 61.99; H, 5.11; N, 3.80.

EXAMPLE XXI

*N-Methyl-Cis-9,10-Dihydro-9,10-Dibromoanthracene-9,10-Endo-3',4'-Pyrrolidine Hydrochloride*

Following the adduct-formation procedure of Example XIX, with equivalent amounts of 9,10-dibromoanthracene and maleic anhydride being used in place of the reactants of Example XIX, cis-9,10-dihydro-9,10-dibromoanthracene-9,10-endo-α,β-succinic anhydride, melting point 269–271° C. from toluene, was formed: yield 82 percent after purification.

By following the procedure of Example I, with an equivalent amount of cis-9,10-dihydro-9,10-dibromo-9,10-endo-α,β-succinic anhydride being used in place of the anhydride of Example I, N-methyl-cis-9,10-dihydro-9,10-dibromoanthracene-9,10-endo-α,β-succinimide (melting point 254–259° C. from isopropanol) was synthesized in 66 percent yield.

Following the reduction procedure of Example I, a solution of 17.47 g. of the imide from above in 550 ml. of dry benzene was treated with 3.05 g. of lithium aluminum hydride in 700 ml. of absolute ether to give 13.0 g. (79.6 percent) of N-methyl-cis-9,10-dihydro-9,10-dibromoanthracene-9,10-endo-3',4'-pyrrolidine, melting point 168.5–170° C. after recrystallization from ether.

*Analysis.*—Calcd. for C₁₉H₁₇NBr₂: C, 54.44; H, 4.09; N, 3.34. Observed: C, 54.36; H, 4.14; N, 3.55.

The hydrochloride salt was formed in ether according to the procedure of Example XIX. Recrystallization from ethanol-ether gave N-methyl-cis-9,10-dihydro-9,10-dibromoanthracene-9,10-endo-3′,4′-pyrrolidine hydrochloride, melting point 269–270° C.

*Analysis.*—Calcd. for C₁₉H₁₈NBr₂Cl: C, 50.08; H, 3.98; N, 3.08; Cl, 7.78. Observed: C, 50.19; H, 4.60; N, 3.08; Cl, 7.60.

We claim:

1. The compounds of the group consisting of those having the formula:

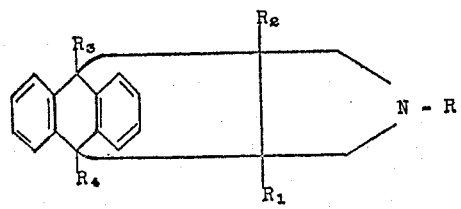

where R is selected from the group consisting of hydrogen, lower alkyl, hydroxy lower alkyl, halo lower alkyl, diloweralkylamino lower alkyl, 3,4,5-triloweralkoxybenzoxy lower alkyl, cyclohexyl, benzyl, phenyl, hydroxyphenyl, diloweralkylaminoloweralkoxyphenyl and 4-pyridyl and $R_1$, $R_2$, $R_3$ and $R_4$ are selected from the group consisting of hydrogen, lower alkyl and halogen, their water-soluble non-toxic acid addition and non-toxic, lower alkyl halo and lower alkyl sulfate quaternary ammonium salts.

2. N - (isopropyl) - cis - 9,10 - dihydroanthracene-9,10-endo-3′,4′-pyrrolidine acid succinate.

3. N - methyl - cis - 9,10 - dihydroanthracene - 9,10-endo-3′,4′-pyrrolidine acid succinate.

4. N - methyl - cis - 9,10 - dihydroanthracene - 9,10-endo-3′,4′-pyrrolidine methosulfate.

5. N - benzyl - cis - 9,10 - dihydroanthracene - 9,10-endo-3′,4′-pyrrolidine hydrochloride.

6. N - (β - hydroxyethyl) - cis - 9,10 - dihydroanthracene-9,10-endo-3′,4′-pyrrolidine acid succinate.

7. N - (β - chloroethyl) - cis - 9,10 - dihydroanthracene-9,10-endo-3′,4′-pyrrolidine hydrochloride.

No references cited.